(12) United States Patent
Araya

(10) Patent No.: US 10,464,380 B2
(45) Date of Patent: Nov. 5, 2019

(54) TIRE STATE DETECTING DEVICE AND WHEEL POSITION SPECIFYING DEVICE

(71) Applicant: PACIFIC INDUSTRIAL CO., LTD., Ogaki-Shi (JP)

(72) Inventor: Takao Araya, Mizuho (JP)

(73) Assignee: PACIFIC INDUSTRIAL CO., LTD., Ogaki-Shi (JP)

( * ) Notice: Subject to any disclaimer, the term of this patent is extended or adjusted under 35 U.S.C. 154(b) by 0 days.

(21) Appl. No.: 15/022,785

(22) PCT Filed: Sep. 9, 2015

(86) PCT No.: PCT/JP2015/075614
§ 371 (c)(1),
(2) Date: Mar. 17, 2016

(87) PCT Pub. No.: WO2017/042910
PCT Pub. Date: Mar. 16, 2017

(65) Prior Publication Data
US 2017/0259627 A1    Sep. 14, 2017

(51) Int. Cl.
*B60C 23/04* (2006.01)
*B60T 8/171* (2006.01)
(Continued)

(52) U.S. Cl.
CPC .......... *B60C 23/0416* (2013.01); *B60C 23/04* (2013.01); *B60C 23/0488* (2013.01);
(Continued)

(58) Field of Classification Search
CPC ............ B60C 23/0416; B60C 23/0489; B60C 23/0488; B60C 23/04;
(Continued)

(56) References Cited

U.S. PATENT DOCUMENTS 9,701,287 B2 * 7/2017 Kretschmann .......... B60T 8/171
2004/0246117 A1 * 12/2004 Ogawa ................ B60C 23/0433
340/445

(Continued)

FOREIGN PATENT DOCUMENTS

JP      2011527971 A    11/2011
JP      2012030739 A    2/2012
(Continued)

OTHER PUBLICATIONS

International Preliminary Report on Patentability; International application No. PCT/JP2015/075614; International filing date Sep. 9, 2015; dated Mar. 13, 2018; Translation of Written Opinion of the International Searching Authority, 8 pages.

*Primary Examiner* — Jarrett J Stark
(74) *Attorney, Agent, or Firm* — Cantor Colburn LLP

(57) ABSTRACT

The tire state detecting device includes a calculating unit that calculates an acceleration difference of the gravitational acceleration value acquired at a first acquiring angle and the gravitational acceleration value acquired at a second acquiring angle; a storage unit that stores a correction formula defined in advance based on an angular difference between the adjacent acquiring angles and an angular difference of the first acquiring angle and the second acquiring angle, and corrects the first acquiring angle to an angle determined in advance from the acceleration difference; a transmission unit that transmits a transmission signal including information indicating the angle determined in advance in addition to information indicating the state of the tire; and a control unit that causes the transmission signal to be transmitted to a wheel position specifying device.

9 Claims, 6 Drawing Sheets

(51) Int. Cl.
*B60T 8/1761* (2006.01)
*G01B 5/00* (2006.01)
*G01B 5/24* (2006.01)

(52) U.S. Cl.
CPC .......... *B60C 23/0489* (2013.01); *B60T 8/171* (2013.01); *B60T 8/1761* (2013.01); *G01B 5/0025* (2013.01); *G01B 5/24* (2013.01); *B60C 23/0486* (2013.01); *B60T 2240/03* (2013.01)

(58) Field of Classification Search
CPC ........ B60C 23/0486–0498; G01B 5/24; G01B 5/0025; B60T 8/1761; B60T 8/171; B60T 2240/03
See application file for complete search history.

(56) References Cited

U.S. PATENT DOCUMENTS

| | | | | |
|---|---|---|---|---|
| 2006/0170281 A1* | 8/2006 | Hattori | .................. | B60T 8/1725 303/20 |
| 2008/0055059 A1* | 3/2008 | Murakami | .......... | B60C 23/0408 340/442 |
| 2009/0012688 A1* | 1/2009 | Hattori | ............... | B60G 17/0165 701/79 |
| 2013/0222128 A1* | 8/2013 | Watabe | ............... | B60C 23/0416 340/447 |
| 2014/0372070 A1 | 12/2014 | Okada | | |
| 2016/0129736 A1* | 5/2016 | Peine | .................. | B60C 23/0416 701/32.3 |
| 2017/0151840 A1* | 6/2017 | Tsujita | ................ | B60C 23/0416 |
| 2017/0164072 A1* | 6/2017 | Tsujita | .................... | H04Q 9/00 |
| 2017/0190224 A1* | 7/2017 | Araya | ................. | B60C 23/0416 |

FOREIGN PATENT DOCUMENTS

| | | |
|---|---|---|
| JP | 2013136301 A | 7/2013 |
| JP | 2014013221 A | 1/2014 |
| JP | 5609393 B2 | 10/2014 |
| JP | 2014226941 A | 12/2014 |
| JP | 2015013635 A | 1/2015 |
| JP | 2015042503 A | 3/2015 |
| JP | 2015137077 A | 7/2015 |
| WO | 2013132968 A1 | 9/2013 |
| WO | 2013132968 A1 | 7/2015 |

* cited by examiner

TIRE STATE DETECTING DEVICE AND WHEEL POSITION SPECIFYING DEVICE

TECHNICAL FIELD

The present invention relates to a tire state detecting device and a wheel position specifying device.

BACKGROUND ART

A wireless tire state monitoring device has been proposed that enables a driver to check the state of a plurality of tires provided on a vehicle while in a vehicle compartment. In this type of tire state monitoring device, a tire state detecting device that transmits a data signal associated with the tire state is arranged on each wheel. Furthermore, a receiver that receives the data signal from the tire state detecting device is arranged on a vehicle body. The tire state monitoring device specifies from which tire state detecting device of which one of the plurality of tires the received data signal is transmitted. In other words, the position of the wheel associated with the received data signal is specified in the receiver.

In patent document 1, on which one of the plurality of wheels each tire state detecting device is arranged is specified by using the ABS (Antilock Brake System). The tire state detecting device of each wheel transmits a transmission signal to the receiver when the wheel is at a rotation angle (hereinafter referred to as angle) determined in advance. The angle determined in advance is detected by an acceleration sensor, which rotates with the wheel. A gravitational acceleration value detected by the acceleration sensor changes between −1G and +1G while the wheel makes one rotation. The tire state detecting device transmits the transmission signal when the wheel is at the angle determined in advance based on the gravitational acceleration value detected by the acceleration sensor. The receiver detects a rotation position of the wheel by using the ABS at an instant of receiving the transmission signal. As mentioned above, the transmission signal is transmitted each time the wheel is at the angle determined in advance. Thus, when the rotation position of each wheel is detected at the instant of receiving the transmission signal, the rotation position of the wheel, where the tire state detecting device that transmitted the relevant transmission signal is arranged, becomes the same every time. Thus, on which one of the plurality of wheels each tire state detecting device is arranged can be specified.

PRIOR ART DOCUMENT

Patent Document

Patent document 1: Japanese National Phase Laid-Open Patent Publication No. 2011-527971

SUMMARY OF THE INVENTION

Problems that the Invention is to Solve

The tire state detecting device intermittently acquires the gravitational acceleration value of the acceleration sensor to reduce the power consumption of the battery, which is the power supply. Thus, there exists a time in which the tire state detecting device cannot acquire the gravitational acceleration value. If the transmission signal is transmitted based on the gravitational acceleration value, therefore, a shift occurs in the angle determined in advance at which the transmission signal is transmitted due to the acquiring frequency of the gravitational acceleration value. The time required to specify the position of the wheel, where each tire state detecting device is arranged, thus may become long.

It is an object of the present invention to provide a tire state detecting device and a wheel position specifying device that can reduce the time required to specify the position of the wheel.

Means for Solving the Problems

In order to solve the above problem, according to a first aspect of the present invention, a tire state detecting device arranged in each of a plurality of wheels of a vehicle is provided. The vehicle includes a rotation position detecting unit that detects a rotation position of each of the plurality of wheels. The tire state detecting device includes a state detecting unit that detects a state of a tire; an acceleration sensor that rotates integrally with the wheel and detects a gravitational acceleration value; an acquiring unit that acquires the gravitational acceleration value for every angle defined in advance while the wheel makes one rotation; a calculating unit that, assuming an angle of the wheel at which the gravitational acceleration value is acquired is an acquiring angle, calculates an acceleration difference of the gravitational acceleration value acquired at a first acquiring angle and the gravitational acceleration value acquired at a second acquiring angle, the first acquiring angle being an acquiring angle after an acquiring angle at which the gravitational acceleration value is inverted from increase to decrease or from decrease to increase, and the second acquiring angle being an angle before the first acquiring angle; a storage unit that stores a correction formula defined in advance based on an angular difference between the adjacent acquiring angles and an angular difference of the first acquiring angle and the second acquiring angle, and corrects the first acquiring angle to an angle determined in advance from the acceleration difference; a transmission unit that transmits a transmission signal including information indicating the angle determined in advance in addition to information indicating the state of the tire; and a control unit that causes the transmission signal to be transmitted to a wheel position specifying device that specifies on which one of the plurality of wheels the tire state detecting device is arranged by acquiring a rotation position of the wheel detected by the rotation position detecting unit with reception of the transmission signal transmitted from the transmission unit as a trigger.

The gravitational acceleration value detected by the acceleration sensor changes between +1G and −1G while the wheel makes one rotation. For every what angle the gravitational acceleration value is acquired, that is, the angular difference between the adjacent acquiring angles can be grasped in advance depends on how many times the acquiring unit acquires the gravitational acceleration value while the wheel makes one rotation (rotation of 360 degrees). If the number of gravitational acceleration values acquired while the wheel makes one rotation is always constant regardless of the rotation speed of the wheel, each acquiring angle becomes the same angle each time, and the gravitational acceleration value is acquired at the same angle each time. The angle corresponding to each acquiring angle when one rotation (0 to 359 degrees) of the wheel is equally divided by each acquiring angle is assumed as a predetermined angle. The predetermined angle of the first acquiring angle is assumed as a first predetermined angle, and the predetermined angle of the second acquiring angle is assumed as a second predetermined angle. If the number of gravitational acceleration values acquired while the wheel makes one rotation is always constant, the first acquiring angle always becomes the first predetermined angle, which is the angle determined in advance. Actually, however, the first acquiring angle may not become the first acquiring angle due to the change in the rotation speed of the wheel involved in the acceleration/deceleration of the vehicle, tolerance of each member configuring the tire state detecting device, and the like.

The inventors of the present invention found that there is a correlation between the angular difference of the first acquiring angle and the first predetermined angle, and the acceleration difference of the gravitational acceleration value acquired at the first acquiring angle and the gravitational acceleration value acquired at the second acquiring angle. That is, if the angular difference is generated between the first acquiring angle and the first predetermined angle, assumption can be made that the same angular difference is also generated between the second acquiring angle and the second predetermined angle. If the angular difference is generated between the first acquiring angle and the first predetermined angle, the acceleration difference is generated in the gravitational acceleration value acquired at the first acquiring angle and the gravitational acceleration value acquired at the second acquiring angle according to such angular difference. The acceleration difference differs by the angular difference between the adjacent acquiring angles and the angular difference of the first acquiring angle and the second acquiring angle. However, if the angular difference between the adjacent acquiring angles and the angular difference of the first acquiring angle and the second acquiring angle can be grasped in advance, the angular difference of the first acquiring angle and the first predetermined angle can be calculated from the acceleration difference.

According to the present invention, the angular difference of the first acquiring angle and the first predetermined angle is calculated by the correlation from the acceleration difference by using the correction formula. The first acquiring angle can be corrected to the angle (first predetermined angle) determined in advance by correcting the first acquiring angle to the first predetermined angle. The tire state detecting device cannot directly derive the angular difference of the first acquiring angle and the first predetermined angle, but can detect the gravitational acceleration value with the acceleration sensor, and thus can derive the acceleration difference. In the wheel position specifying device, the first acquiring angle is corrected to the angle determined in advance from the acceleration difference, so that the variation (difference in rotation position) in the rotation position of the wheel, on which the tire state detecting device that transmitted the transmission signal is arranged, and the rotation positions of the other wheels becomes easy to grasp. Thus, compared to when the first acquiring angle is not corrected with the correction formula, the time required to specify on which one of the plurality of wheels the tire state detecting device is arranged is reduced.

In the tire state detecting device, the control unit preferably causes the transmission signal to be transmitted at the first acquiring angle, the transmission signal including information of an angular difference of the first acquiring angle and the angle determined in advance calculated from the acceleration difference and the correction formula, in addition to the information indicating the state of the tire.

The wheel position specifying device acquires the rotation position of the wheel detected by the rotation detecting unit at the instant of receiving the transmission signal. The wheel position specifying device reflects the angular difference of the first acquiring angle and the first predetermined angle on the rotation position of the wheel acquired from the rotation position detecting unit. Thus, the rotation position of the wheel acquired from the rotation position detecting unit can be corrected to the rotation position acquired at the angle (first predetermined angle) determined in advance. Thus, the wheel position specifying device can specify the position of the wheel, on which each tire state detecting device is arranged, from the rotation position of the wheel acquired at the angle determined in advance. Thus, the time required to specify on which one of the plurality of wheels the tire state detecting device is arranged is reduced.

In the tire state detecting device described above, the control unit preferably calculates an angular difference of the first acquiring angle and the angle determined in advance from the acceleration difference and the correction formula, calculates a time difference from the first acquiring angle to the angle determined in advance based on the angular difference, and causes the transmission signal including information of the time difference to be transmitted at the first acquiring angle.

The control unit calculates the time difference from when the rotation position of the wheel reaches the angle defined in advance from the first acquiring angle from the angular difference of the first acquiring angle and the angle defined in advance. The wheel position specifying device then acquires the rotation position at the time corresponding to the time difference when receiving the transmission signal. Thus, the wheel position specifying device can specify the position of the wheel, on which each tire state detecting device is arranged, from the rotation position of the wheel acquired at the angle determined in advance. Therefore, the time required to specify on which one of the plurality of wheels the tire state detecting device is arranged is reduced.

In the tire state detecting device described above, the control unit preferably calculates an angular difference of the first acquiring angle and the angle determined in advance from the acceleration difference and the correction formula, and delays a time to transmit the transmission signal according to the calculated angular difference to cause the transmission signal to be transmitted at a constant angle.

The angle at which the transmission signal is transmitted is shifted from the angle determined in advance due to the acquiring frequency. According to such configuration, the error can be reduced by correcting the first acquiring angle to the angle determined in advance. In this case, when the wheel position specifying device acquires the rotation position of the wheel at the instant of receiving the transmission signal, variation is less likely to occur in the rotation position of the wheel, where the tire state detecting device that transmitted the transmission signal is arranged. Therefore, the time required to specify on which one of the plurality of wheels the tire state detecting device is arranged is reduced.

In order to solve the problem described above, according to a second aspect of the present invention, a wheel position specifying device that specifies on which one of a plurality of wheels a tire state detecting device is arranged based on a transmission signal transmitted from the tire state detecting device arranged on each of the plurality of wheels of a vehicle is provided. The tire state detecting device includes a state detecting unit that detects a state of a tire, an acceleration sensor that rotates integrally with the wheel and detects a gravitational acceleration value, an acquiring unit that acquires the gravitational acceleration value for every angle defined in advance while the wheel makes one rotation, and a transmission unit that, assuming an angle of the wheel at when the gravitational acceleration value is acquired is an acquiring angle, transmits at a first acquiring angle, information indicating an acceleration difference of the gravitational acceleration value acquired at a first acquiring angle and the gravitational acceleration value acquired at the second acquiring angle in the transmission signal, the first acquiring angle being an acquiring angle after the acquiring angle at which the gravitational acceleration value is inverted from increase to decrease or from decrease to increase, and the second acquiring angle being an acquiring angle before the first acquiring angle. The wheel position specifying device includes a reception side acquiring unit that acquires a rotation position of each wheel at an instant of receiving the transmission signal from a rotation position detecting unit mounted on the vehicle, a reception side storage unit that stores a correction formula defined in advance based on an angular difference between the adjacent acquiring angles and an angular difference of the first acquiring angle and the second acquiring angle, and corrects the first acquiring angle to an angle determined in advance from the acceleration difference, and a specifying unit that corrects a rotation position acquired by the reception side acquiring unit to a rotation position at the angle determined in advance, and specifies on which wheel the tire state detecting device is arranged from variation in the corrected rotation position.

Accordingly, the reception side acquiring unit acquires the rotation position of the wheel at the instant of receiving the transmission signal from the rotation position detecting unit. The transmission signal includes information indicating the acceleration difference. Thus, the rotation position of the wheel at the instant of receiving the transmission signal transmitted at the first acquiring angle can be corrected to the rotation position of the wheel at the instant of receiving the transmission signal transmitted at the angle determined in advance by using the correction formula stored in the reception side storage unit. Thus, on which wheel each tire state detecting device is arranged can be specified from the variation in the corrected rotation position of the wheel. Thus, the variation in the rotation position of the wheel acquired from the rotation position detecting unit corresponding to the wheel, on which the tire state detecting device that transmitted the transmission signal is arranged, is reduced by correcting the rotation position of the wheel. The time required to specify the position of the wheel where the tire state detecting device is arranged thus is reduced.

Effects of the Invention

According to the present invention, the time required to specify the position of the wheel can be reduced.

MODE FOR CARRYING OUT THE INVENTION

One embodiment of a tire state detecting device and a wheel position specifying device of the present invention will be hereinafter described with reference to FIGS. 1 to 8.

Figure 1A:
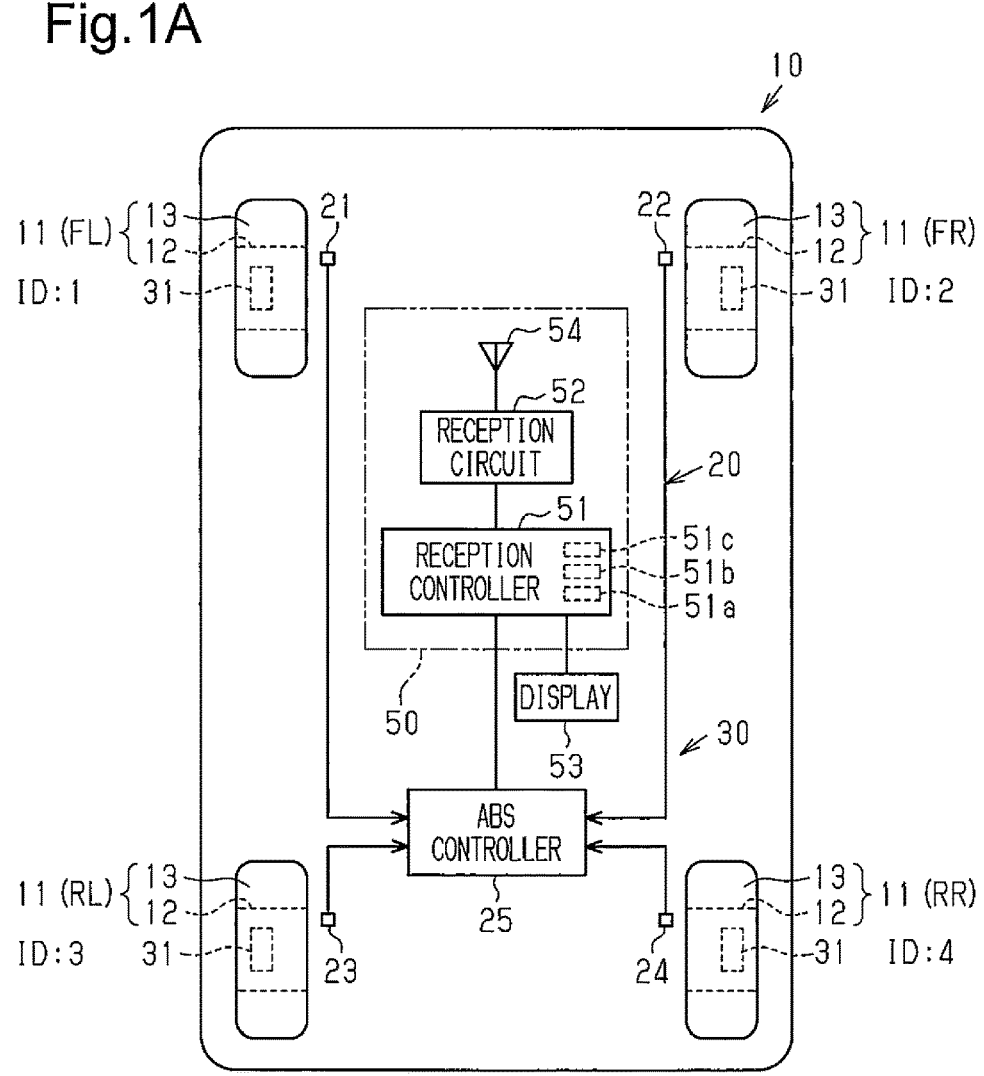
FIG. 1A is a schematic configuration view of a vehicle mounted with a wheel position specifying device according to one embodiment of the present invention.

As shown in FIG. 1A, an ABS (Antilock Brake System) 20 and a tire state monitoring device 30 are mounted on a vehicle 10. The ABS 20 includes an ABS controller 25, and rotation sensor units 21 to 24 corresponding to four wheels 11 of the vehicle 10. The first rotation sensor unit 21 corresponds to a left front wheel FL arranged on the left front side, and the second rotation sensor unit 22 corresponds to a right front wheel FR arranged on the right front side. The third rotation sensor unit 23 corresponds to a left rear wheel RL arranged on the left rear side, and the fourth rotation sensor unit 24 corresponds to a right rear wheel RR arranged on the right rear side. Each wheel 11 is configured from a vehicle wheel 12, and a tire 13 attached to the vehicle wheel 12. The ABS controller 25 includes a microcomputer, and the like. The ABS controller 25 obtains the rotation position (rotation angle) of each wheel 11 based on a pulse count value from the rotation sensor unit 21 to 24.

Figure 2A:
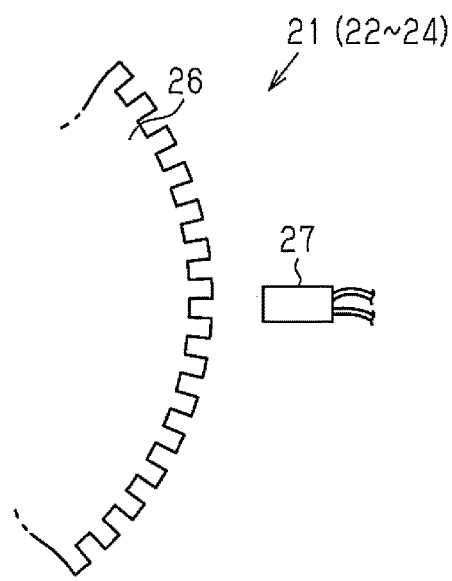
FIG. 2A is a schematic configuration view of a rotation sensor unit.

As shown in FIG. 2A, each rotation sensor unit 21 to 24 serving as a rotation position detecting unit includes a gear 26 that integrally rotates with the wheel 11, and a detector 27 arranged to face the outer circumferential surface of the gear 26. A plurality of (48 in the present embodiment) teeth is arranged at an equiangular interval on the outer circumferential surface of the gear 26. The detector 27 detects a pulse generated by the rotation of the gear 26. The ABS controller 25 is wire connected to each detector 27. The ABS controller 25 obtains the rotation position of each wheel 11 based on a count value of the pulse (hereinafter referred to as pulse count value) of each detector 27. Specifically, the gear 26 causes the detector 27 to generate a pulse of a number corresponding to the number of teeth each time the gear 26 makes one rotation. The ABS controller 25 counts the pulse generated by the detector 27. The ABS controller 25 divides 360 degrees by the number of pulses generated by the detector 27 while the wheel 11 makes one rotation (360 degrees) to grasp how many times the gear 26 rotated for one pulse count.

Figure 2B:
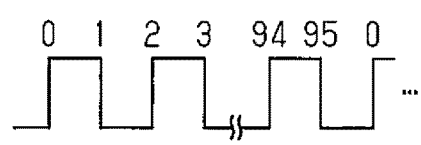
FIG. 2B is a schematic view illustrating a pulse generated by a detector and a method for counting the pulse.

As shown in FIG. 2B, the ABS controller 25 counts the rise and fall of the pulse to count from 0 to 95. Thus, the pulse count value 1 is incremented by one each time the wheel 11 is rotated 3.75 degrees.

Next, the tire state monitoring device 30 will be described.

As shown in FIG. 1A, the tire state monitoring device 30 includes a transmitter 31 attached to each of the four wheels 11, and a receiver 50 installed on the vehicle body of the vehicle 10. Each transmitter 31 is arranged in an internal space of the tire 13, which tire 13 is attached to the vehicle wheel 12. Each transmitter 31 serving as the tire state detecting device detects the state of the corresponding tire 13, and wirelessly transmits a signal including the data indicating the tire state.

Figure 3:
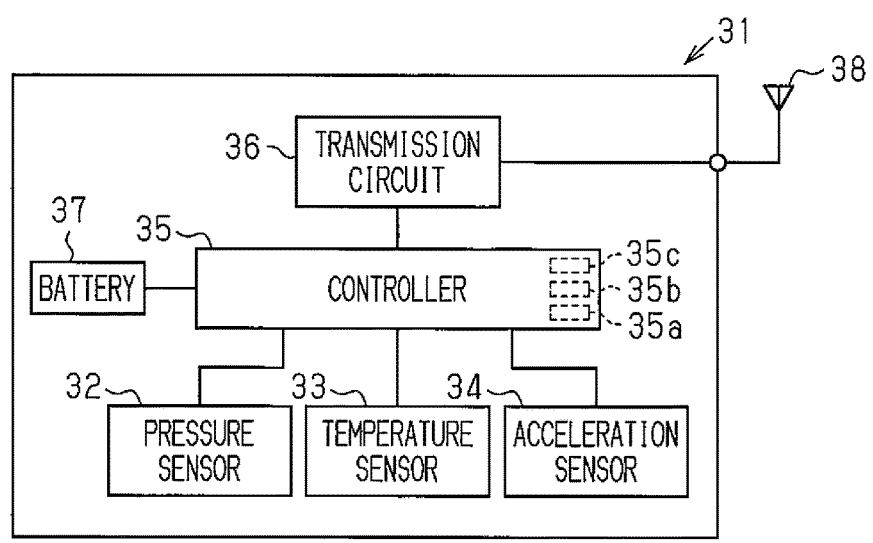
FIG. 3 is a schematic configuration view of a transmitter.

As shown in FIG. 3, each transmitter 31 includes a pressure sensor 32, a temperature sensor 33, an acceleration sensor 34, a controller 35, a transmission circuit 36, a transmission antenna 38, and a battery 37, which becomes the power source of the transmitter 31. The transmitter 31 is operated by the supply power from the battery 37, and the controller 35 comprehensively controls the operation of the transmitter 31. The pressure sensor 32 detects the pressure (tire inner pressure) in the corresponding tire 13. The temperature sensor 33 detects the temperature (tire inner temperature) in the corresponding tire 13. The pressure in the tire 13 and the temperature in the tire 13 are detected as the states of the tire 13 by using the pressure sensor 32 and the temperature sensor 33 serving as state detecting units.

Figure 1B:
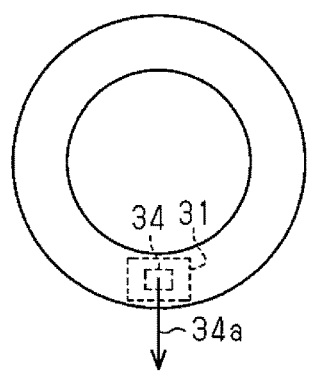
FIG. 1B is a schematic view showing a relationship of a detection axis of an acceleration sensor and a wheel.

As shown in FIG. 1B, the acceleration sensor 34 integrally rotates with the wheel 11, and detects the acceleration acting on itself. The acceleration sensor 34 is arranged such that a detection axis 34a is directed downward in a vertical direction when the transmitter 31 is located at a lowermost position of the wheel 11. The detection axis 34a detects a centrifugal acceleration value as a DC component and detects a gravitational acceleration value as an AC component. An acceleration value obtained by adding the gravitational acceleration value to the centrifugal acceleration value is output from the acceleration sensor 34.

Figure 4A:
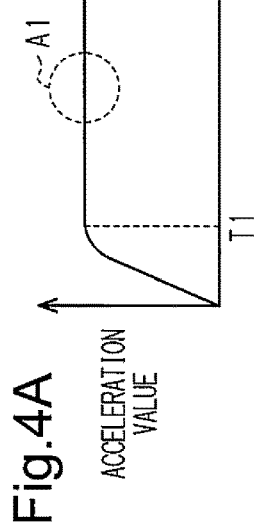
FIG. 4A is a graph showing change in an acceleration value.

As shown in FIG. 4A, assume a case in which the vehicle 10 accelerated up to time T1, traveled at an equal speed from time T1 to time T2, and decelerated from time T2. The acceleration value detected by the acceleration sensor 34 increases until time T1 by the increase in the centrifugal acceleration value caused by the acceleration of the vehicle 10, and then decreases from time T2 by the decrease in the centrifugal acceleration value caused by the deceleration of the vehicle 10. The acceleration value is substantially constant from time T1 to time T2, during which the vehicle 10 is travelling at an equal speed. The acceleration value includes the gravitational acceleration value as the AC component. Thus, the acceleration value changes in a sinusoidal manner according to the gravitational acceleration.

Figure 4B:
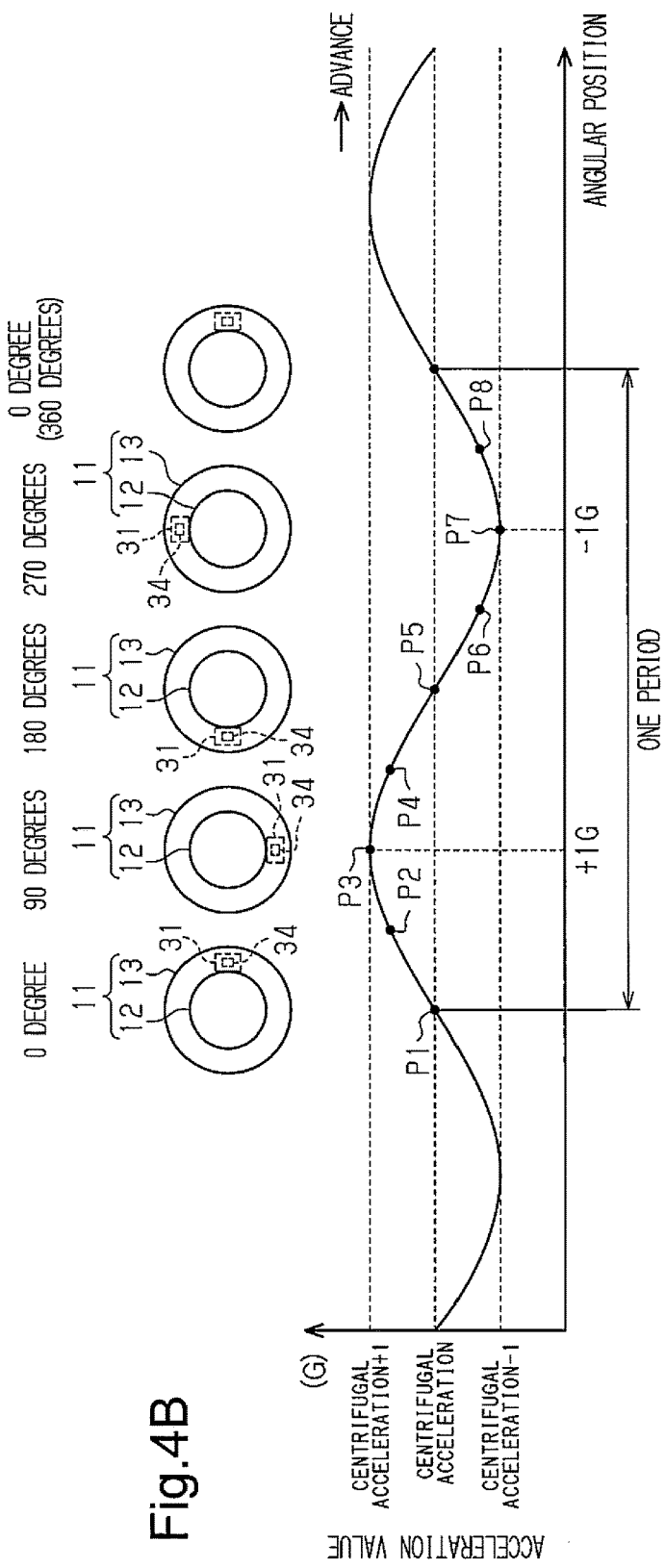
FIG. 4B is a graph showing change in the acceleration value due to a gravitational acceleration value.

FIG. 4B shows the portion of reference numeral A1 in FIG. 4A in an enlarged manner. The AC component contained in the acceleration value changes in a sinusoidal manner between ±1G (voltage corresponding thereto) by the rotation of the wheel 11. Assume that the angle of the wheel 11 when the transmitter 31 is located at the front most position of the wheel 11 is 0 degree, and the angle of when the wheel 11 advanced in a direction the vehicle 10 advances is positive. When the angle of the wheel 11 is 0 degree, the acceleration sensor 34 detects the acceleration value in which 0G is added as the gravitational acceleration value to the centrifugal acceleration value. When the angle of the wheel 11 is +90 degrees, the transmitter 31 (acceleration sensor 34) is located at the lowermost position of the wheel 11, and the acceleration sensor 34 detects the acceleration value in which +1G is added as the gravitational acceleration value to the centrifugal acceleration value. When the angle of the wheel 11 is +180 degrees, the transmitter 31 is located at the rearmost position of the wheel 11, and the acceleration sensor 34 detects the acceleration value in which 0G is added as the gravitational acceleration value to the centrifugal acceleration value. When the angle of the wheel 11 is +270 degrees, the transmitter 31 is located at the uppermost position of the wheel 11, and the acceleration sensor 34 detects the acceleration value in which −1G is added as the gravitational acceleration value to the centrifugal acceleration value.

As shown in FIG. 3, the controller 35 includes a microcomputer and the like including a CPU 35a, a storage unit (RAM, ROM, etc.) 35b, and a timer 35c. An ID, which is identification information unique to each transmitter 31, is registered in the storage unit 35b. The ID is information used to identify each transmitter 31 in the receiver 50. In the present embodiment, the ID of the transmitter 31 arranged on the left front wheel FL is "1", the ID of the transmitter 31 arranged on the right front wheel FR is "2", the ID of the transmitter 31 arranged on the left rear wheel RL is "3", and the ID of the transmitter 31 arranged on the right rear wheel RR is "4". For the sake of convenience of explanation, the ID is expressed as "1" to "4", but this is not the sole case.

The controller 35 serving as an acquiring unit acquires the tire inner pressure data from the pressure sensor 32, the tire inner temperature data from the temperature sensor 33, and the acceleration data from the acceleration sensor 34 at an acquiring frequency defined in advance. The acquiring frequency of each data may be the same, or may be different depending on the data.

As shown in FIG. 4B, the controller 35 acquires the acceleration data each time the controller 35 is located at eight acquiring angles P1 to P8 while the wheel 11 makes one rotation (one period). Although the rotation speed of the wheel 11 changes by the acceleration/deceleration from the driver, the controller 35 calculates the time required for the wheel 11 to make one rotation from the acceleration value of the acceleration sensor 34. As described above, the acceleration value of the acceleration sensor 34 changes by the speed of the vehicle 10, and hence the speed of the vehicle 10, and furthermore, the time required for the wheel 11 to make one rotation can be calculated from the acceleration value. The controller 35 determines the acquiring frequency, which is obtained by equally dividing the time required for the wheel 11 to make one rotation by eight, and acquires the acceleration data from the acceleration sensor 34 at the determined acquiring frequency. The controller 35 accordingly acquires the acceleration data from the acceleration sensor 34 every 45 degrees, which is the angular difference between each acquiring angle P1 to P8 while the wheel 11 makes one rotation.

The controller 35 serving as the control unit outputs data including the tire inner pressure data, the tire inner temperature data, and the ID to the transmission circuit 36. The transmission circuit 36 serving as the transmission unit modulates the data from the controller 35 and generates a transmission signal. The transmission circuit 36 wirelessly transmits the transmission signal from the transmission antenna 38.

As shown in FIG. 1A, the receiver 50 includes a reception controller 51, a reception circuit 52, and a reception antenna 54. A display 53 is connected to the reception controller 51. The reception controller 51 includes a microcomputer, and the like including a reception side CPU 51a, a reception side storage unit (ROM, RAM, etc.) 51b, and a reception side timer 51*c*. A program for comprehensively controlling the operation of the receiver 50 is stored in the reception side storage unit 51*b*. The reception circuit 52 demodulates the transmission signal received from each transmitter 31 through the reception antenna 54, and transmits the same to the reception controller 51.

The reception controller 51 grasps the tire inner pressure and the tire inner temperature serving as the states of the tire 13 corresponding to the transmitter 31 of the transmission source based on the transmission signal from the reception circuit 52. The reception controller 51 displays the information associated with the tire inner pressure, and the like on the display 53.

The reception controller 51 is connected to the ABS controller 25, and is able to acquire the pulse count value of each rotation sensor unit 21 to 24 through the ABS controller 25.

Next, a wheel position specifying process for specifying on which wheel 11 each transmitter 31 is arranged will be described with reference to FIGS. 5A to 5C. First, the transmitter 31 will be described in detail.

Figure 5A:
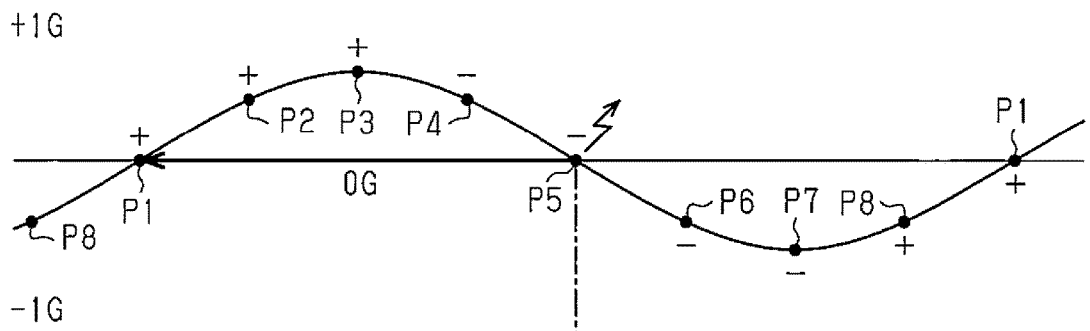
FIG. 5A is a graph showing a predetermined angle of each acquiring angle.

As shown in FIG. 5A, the controller 35 of the transmitter 31 acquires the acceleration data at each acquiring angle P1 to P8. The controller 35 compares the acceleration value acquired at one acquiring angle, and the acceleration value acquired at the acquiring angle one time before the relevant acquiring angle. The controller 35 then determines if the acceleration value acquired at each acquiring angle increased or decreased from the acceleration value acquired at the acquiring angle one time before. In FIGS. 5A to 5C, "+" is denoted when the acceleration value increased from the acceleration value acquired at the acquiring angle one time before, and "−" is denoted when the acceleration value decreased from the acceleration value acquired at the acquiring angle one time before. In the following description as well, the acquiring angle at which the acceleration value increased from the acquiring angle one time before is appropriately expressed as "+", and the acquiring angle at which the acceleration value decreased from the acquiring angle one time before is appropriately expressed as "−". Although the acceleration value is obtained by adding the gravitational acceleration value to the centrifugal acceleration value, the possibility the speed of the wheel 10 will drastically change while the wheel 11 makes one rotation is low. Thus, the change in the centrifugal acceleration value can be ignored. The change in the acceleration value between the acquiring angles P1 to P8 thus can be assumed as the change by the gravitational acceleration value. Therefore, assumption can be made that the acceleration sensor 34 detects the gravitational acceleration value.

The timing at which the acceleration value acquired at each acquiring angle P1 to P8 is inverted from increase to decrease or from decrease to increase is when the transmitter 31 crosses the lowermost position or the uppermost position of the wheel 11. When the acceleration values acquired at the acquiring angles P1 to P8 are inverted from increase to decrease or from decrease to increase, the acquiring angles are lined in the order of "+" "−", or in the order of "−" "+" in the advancing direction of the vehicle 10. When the acquiring angles are lined in the order of "+" "−", it can be understood that the transmitter 31 crossed the lowermost position of the wheel 11. Furthermore, when the transmission signal is transmitted at the timing of "−" of "+" "−", the transmission signal is transmitted from the transmitter 31 at the timing the transmitter 31 crosses the lowermost position of the wheel 11. When the acquiring angles are lined in the order of "−" "+", it can be understood that the transmitter 31 crossed the uppermost position of the wheel 11. Furthermore, when the transmission signal is transmitted at the timing of "+" of "−" "+", the transmission signal is transmitted from the transmitter 31 at the timing the transmitter 31 crosses the uppermost position of the wheel 11.

The transmission signal is sometimes transmitted by the incidental increase/decrease inversion of the acceleration value caused by disturbance and the like. In order to suppress this, it is assumed that the transmitter 31 crossed the lowermost position of the wheel 11 when the acquiring angles are lined in the order of "+" "+" "−" "−" (hereinafter described as transmission pattern). Furthermore, the controller 35 causes the transmission signal to be transmitted from the transmitter 31 at the acquiring angle that becomes the second "−" in the transmission pattern described above.

The number of times the acceleration value is acquired while the wheel 11 makes one rotation is eight times. 0 degree to 359 degrees are equally divided to the eight acquiring angles P1 to P8, so that each acquiring angle P1 to P8 is set every 45 degrees with 0 degree as P1. The angle of the wheel 11 is 90 degrees at the acquiring angle P3 that becomes the second "+" in the transmission pattern, and the angle of the wheel 11 is 180 degrees at the acquiring angle P5 advanced by two from the acquiring angle P3. When the transmission signal is transmitted at the acquiring angle P5 that becomes the second "−" in the transmission pattern, the transmission signal is constantly transmitted from the transmitter 31 when the wheel 11 is at 180 degrees. Actually, the acceleration value corresponding to each acquiring angle is intermittently acquired. In addition, each acquiring angle P1 to P8 may not be the same angle each time and may slightly vary depending on the tolerance and measurement error of each member configuring the transmitter 31, slight change in speed while the wheel 11 makes one rotation, and the like.

Next, the receiver 50 will be described with reference to FIG. 1.

As shown in FIG. 1, the reception controller 51 of the receiver 50 acquires the pulse count value of each rotation sensor unit 21 to 24, that is, the rotation position of the wheel 11 from the ABS controller 25 at the time of receiving the transmission signal. The reception controller 51 then specifies on which wheel 11 each transmitter 31 is arranged. Hereinafter, description will be made focusing on the wheel 11, where the transmitter 31 with the ID "1" is arranged, for example, of the four wheels 11.

When receiving the transmission signal transmitted from the transmitter 31 with the ID "1", the reception controller 51 acquires the pulse count value of each rotation sensor unit 21 to 24 from the ABS controller 25 at the instant of receiving such transmission signal. The number of rotations of each wheel 11 differs by the influence of differential gear, and the like. Thus, when the pulse count value of each rotation sensor unit 21 to 24 is acquired over plural times at the instant of receiving the transmission signal transmitted from the transmitter 31 with the ID "1", the variation becomes small only in the pulse count value of the rotation sensor unit 21 to 24 corresponding to the wheel 11 where the transmitter 31 with the ID "1" is arranged. If the transmission signal is constantly transmitted at an angle determined in advance (180 degrees), the pules count value of one rotation sensor unit of the plurality of rotation sensor units 21 to 24 will always take the same value. The reception controller 51 receives the transmission signal over plural times. The reception controller 51 acquires the pulse count value of each rotation sensor unit 21 to 24 each time the reception controller 51 receives the transmission signal, and obtains the difference in the pulse count value of each rotation sensor unit 21 to 24. The reception controller 51 specifies that the transmitter 31 with the ID "1" is arranged on the wheel corresponding to the rotation sensor unit with the smallest variation.

Figure 6:
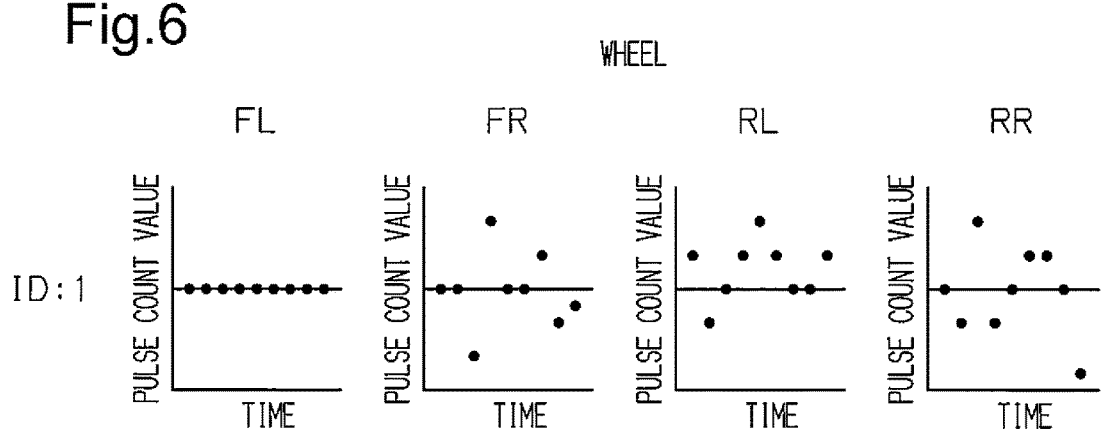
FIG. 6 is a graph showing a pulse count value of each rotation sensor unit at the instant of receiving the transmission signal transmitted from the transmitter with ID "1".

As shown in FIG. 6, in the present embodiment, the pulse count value of the rotation sensor unit 21 corresponding to the left front wheel FL indicates a constant value. Thus, the wheel 11, where the transmitter 31 with the ID "1" is arranged, is understood to be arranged on the left front wheel FL of the vehicle 10. Similar process can be carried out for the transmitters 31 with the IDs "2", "3", and "4" to specify on which wheel 11 the transmitter 31 with the respective ID is arranged.

As described above, the transmission signal is actually not always transmitted at the angle determined in advance (180 degrees). That is, the angle at which the transmission signal is transmitted slightly varies.

As shown in FIG. 5A, assume that the angle corresponding to each acquiring angle obtained by equally dividing 0 degree to 359 degrees, which is one rotation of the wheel 11, to eight acquiring angles P1 to P8 is a predetermined angle. Furthermore, the acquiring angle P5 at which the controller 35 transmits the transmission signal is assumed as a first acquiring angle P5, and the predetermined angle of the first acquiring angle P5 is assumed as a first predetermined angle.

Figure 5B:
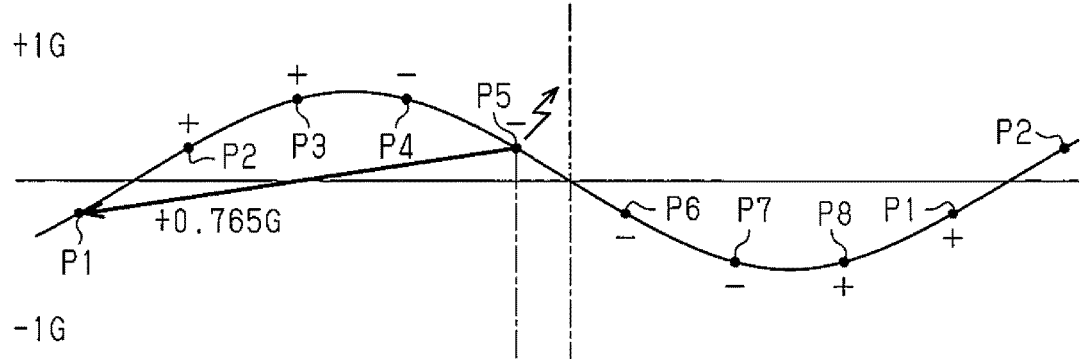
FIG. 5B is a graph showing a state in which each acquiring angle is shifted −15 degrees from the predetermined angle.
Figure 5C:
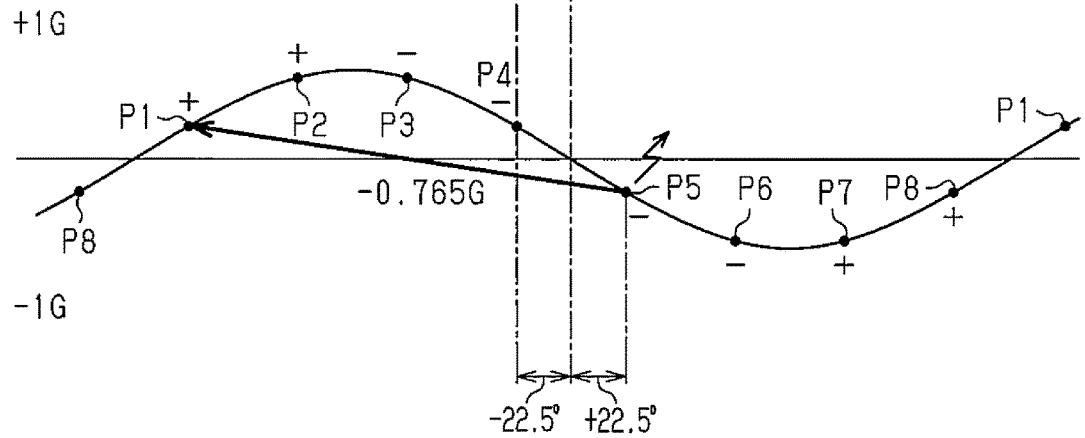
FIG. 5C is a graph showing a state in which each acquiring angle is shifted +15 degrees from the predetermined angle.

As shown in FIGS. 5B and 5C, the time required for the wheel 11 to make one rotation is small. Thus, a drastic change in speed is less likely to occur while the wheel 11 makes one rotation. It can be assumed, therefore, that the shift of each acquiring angle P1 to P8 from the predetermined angle is the same angle among the acquiring angles P1 to P8.

The shift (angular difference) of the acquiring angle P1 to P8 and the predetermined angle is, at most, half the angular difference of the adjacent acquiring angles. In the present embodiment, the shift of the acquiring angle and the predetermined angle is, at most, ±22.5 degrees. In this case, when the transmission signal is transmitted while being shifted from the first predetermined angle, a shift also occurs even in the pulse count value acquired by the reception controller 51 at the instant of receiving the transmission signal.

As shown in FIG. 6, when the transmission signal is constantly transmitted at the angle determined in advance, the pulse count value acquired by the rotation sensor unit corresponding to the wheel 11, where the transmitter 31 that transmitted the relevant transmission signal is arranged, is assumed as an ideal pulse count value. In the present embodiment, when the pulse count value is acquired at the instant the transmission signal is transmitted, the pulse count value acquired by the rotation sensor unit corresponding to the wheel 11, where the transmitter 31 that transmitted the relevant transmission signal is arranged, is shifted by ±6 pulse count values (pulse count value worth ±22.5 degrees) from the ideal pulse count value, as shown in FIG. 7.

Figure 7:
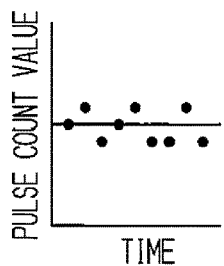
FIG. 7 is a graph showing a pulse count value of a rotation sensor unit corresponding to a wheel, on which a transmitter that transmitted a transmission signal transmitted in a state the first acquiring angle is shifted from the first predetermined angle is arranged.

As shown in FIG. 7, if the variation in the pulse count value acquired by the rotation sensor unit corresponding to the wheel 11 where the transmitter 31 that transmitted the transmission signal is arranged is large, the difference with the pulse count value acquired by the other rotation sensor units is less likely to become large, and the time required to specify the wheel position becomes long.

Thus, in the present embodiment, a wheel position specifying process is always carried out from the pulse count value at the angle determined in advance in the receiver 50 by correcting the first acquiring angle.

First, among the plurality of acquiring angles P1 to P8, one of the acquiring angles P1 to P8 before the first acquiring angle P5 that becomes the trigger for transmitting the transmission signal is assumed as a second acquiring angle. The acquiring angle P1 four before the first acquiring angle P5 is assumed as the second acquiring angle P1, and the predetermined angle of the second acquiring angle P1 is assumed as a second predetermined angle. The first predetermined angle is 180 degrees, and the second predetermined angle is 0 degree (360 degrees).

Here, a correlation is found between the angular difference of the first acquiring angle P5 and the first predetermined angle and the acceleration difference of the acceleration value acquired at the first acquiring angle P5 and the acceleration value acquired at the second acquiring angle P1 (acceleration value acquired at the first acquiring angle P5—acceleration value acquired at the second acquiring angle P1). As described above, the possibility the speed of the vehicle 10 will drastically change while the wheel 11 makes one rotation is low, and the centrifugal acceleration value of the acceleration value acquired at the first acquiring angle P5 can be assumed to be the same as the centrifugal acceleration value of the acceleration value acquired at the second acquiring angle P1. Therefore, the acceleration difference of the first acquiring angle P5 and the second acquiring angle P1 can be referred to as the difference of the gravitational acceleration value acquired at the first acquiring angle P5 and the gravitational acceleration value acquired at the second acquiring angle P1.

As shown in FIG. 5A, if a difference of the first acquiring angle P5 and the first predetermined angle does not exist, the acceleration difference of the acceleration value acquired at the first acquiring angle P5 and the acceleration value acquired at the second acquiring angle P1 becomes 0G.

As shown in FIG. 5B, if the angular difference of the first acquiring angle P5 and the first predetermined angle is −22.5 degrees, the acceleration difference of the acceleration value acquired at the first acquiring angle P5 and the acceleration value acquired at the second acquiring angle P1 becomes +0.765G.

As shown in FIG. 5C, if the angular difference of the first acquiring angle P5 and the first predetermined angle is +22.5 degrees, the acceleration difference of the acceleration value acquired at the first acquiring angle P5 and the acceleration value acquired at the second acquiring angle P1 becomes −0.765G.

The correlation between the angular difference of the first acquiring angle P5 and the first predetermined angle and the acceleration difference described above differs depending on the angular difference (45 degrees in the present embodiment) between the adjacent acquiring angles P1 to P8 and the angular difference (180 degrees in the present embodiment) of the first acquiring angle P5 and the second acquiring angle P1. The number of acquiring angles P1 to P8 obtained while the wheel 11 makes one rotation and the angular difference of the first acquiring angle P5 and the second acquiring angle P1 are set in advance. Thus, the angular difference of the first acquiring angle P5 and the first predetermined angle can be calculated from the acceleration difference of the acceleration value acquired at the first acquiring angle P5 and the acceleration value acquired at the second acquiring angle P1. Assuming the angular difference of the first acquiring angle P5 and the first predetermined angle is a correction angle, the correction angle Y is expressed with the following correction formula (1).

$$Y = -\frac{\alpha}{\beta} X \qquad (1)$$

Here, α is a value of one half of the angular difference between the acquiring angles P1 to P8, that is, the absolute value of the maximum value of the shift of the first acquiring angle P5 from the first predetermined angle. Therefore, α can be derived from the angular difference between the acquiring angles P1 to P8. β is the absolute value of the maximum value of the acceleration difference of the acceleration value acquired at the first acquiring angle P5 and the acceleration value acquired at the second acquiring angle P1. β can be derived from the relationship of the angular difference of the first acquiring angle P5 and the second acquiring angle P1, and the acceleration value. X is the acceleration difference of the acceleration value acquired at the first acquiring angle P5 and the acceleration value acquired at the second acquiring angle P1.

In the present embodiment, α=22.5, β=0.765. Thus, the correction formula becomes the following formula (2).

$$Y = -\frac{22.5}{0.765}X \qquad (2)$$

For example, if the acceleration difference does not exist (X=0), Y=0 is obtained, and the angular difference is not found between the first acquiring angle P5 and the first predetermined angle. If the acceleration difference is −0.765G (X=−0.765), Y=22.5 is obtained, and the angular difference between the first acquiring angle P5 and the first predetermined angle is +22.5 degrees. If the acceleration difference is +0.765G (X=+0.765), Y=−22.5 is obtained, and the angular difference between the first acquiring angle P5 and the first predetermined angle is −22.5 degrees.

Figure 8:
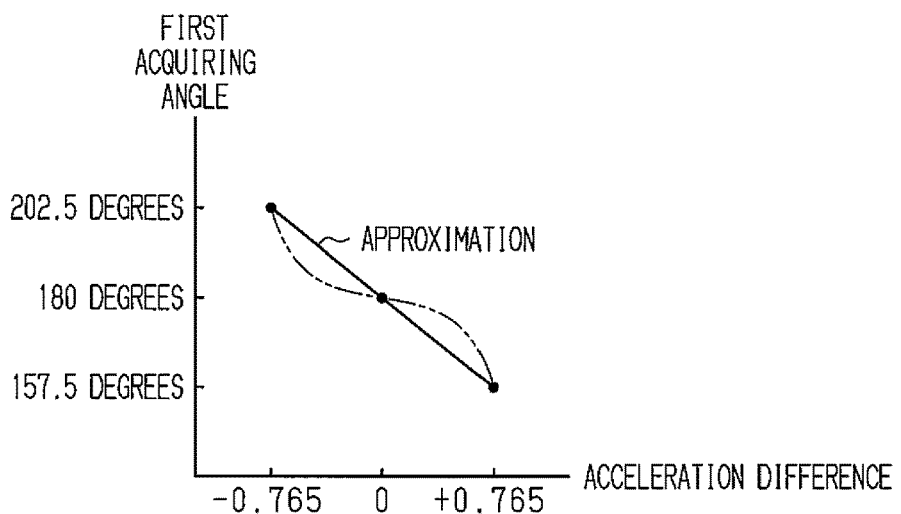
FIG. 8 is a graph showing a relationship of the angular difference of the first acquiring angle and the first predetermined angle, and the acceleration difference of the acceleration value acquired at the first acquiring angle and the acceleration value acquired at the second acquiring angle.

As shown with a solid line in FIG. 8, the correction formula (1) is an approximate expression of when the acceleration difference is assumed to linearly change in accordance with the angular difference of the first acquiring angle P5 and the first predetermined angle. The correction formula (1) indicates the angular difference per one acceleration difference, that is, the angular difference of the first acquiring angle P5 and the first predetermined angle. Since the acceleration difference actually changes in a sinusoidal manner in accordance with the angular difference of the first acquiring angle and the first predetermined angle, as shown with a chain double dashed line in FIG. 8, the correction formula that also takes into consideration such aspect can also be adopted.

The correction formula (2) is stored in the storage unit 35*b* of the controller 35. The controller 35 serving as a calculating unit calculates the acceleration difference of the acceleration value acquired at the first acquiring angle P5 and the acceleration value acquired at the second acquiring angle P1, and also calculates the correction angle (angular difference of first acquiring angle P5 and first predetermined angle) from the acceleration difference. The controller 35 then transmits the transmission signal to the receiver 50, the transmission signal including the data of the correction angle in addition to the data indicating the state of the tire.

The reception controller 51 acquires the pulse count value of each rotation sensor unit 21 to 24 at the instant the transmission signal is transmitted, and replaces the correction angle included in the transmission signal to the pulse count value (correction angle/3.75). The reception controller 51 then adds (or subtracts) the correction angle to (or from) the pulse count value of each rotation sensor unit 21 to 24 to correct the acquired pulse count value. The pulse count value of each rotation sensor unit 21 to 24 thus can be assumed as the pulse count value of when the first acquiring angle P5 is corrected to the angle determined in advance.

Therefore, when the reception controller 51 acquires the pulse count value of each rotation sensor unit 21 to 24 at the instant of receiving the transmission signal, the variation becomes smaller in the pulse count value of after the correction compared to the pulse count value of the rotation sensor unit corresponding to the wheel 11 where the transmitter 31 that transmitted the relevant transmission signal is arranged.

Therefore, the embodiment described above has the following effects.

(1) A correlation exists between the angular difference of the first acquiring angle P5 and the first predetermined angle, and the acceleration difference of the acceleration value acquired at the first acquiring angle P5 and the acceleration value acquired at the second acquiring angle P1. Since the correction formula derived from the correlation is stored in the storage unit 35*b*, the reception controller 51 is able to correct the first acquiring angle P5 to the angle (first predetermined angle) determined in advance. Thus, the receiver 50 is able to specify on which one of the plurality of wheels 11 each transmitter 31 is arranged from the variation of the pulse count value assumed to be acquired at the angle determined in advance. Therefore, the time required to specify on which one of the plurality of wheels 11 each transmitter 31 is arranged is reduced.

(2) The transmitter 31 transmits the information of the correction angle calculated from the acceleration difference and the correction formula in the transmission signal. The reception controller 51 adds or subtracts the pulse count value corresponding to the correction angle to or from the pulse count value in each rotation sensor unit 21 to 24 at the instant of receiving the transmission signal. The reception controller 51 thereby obtains the pulse count value assumed to be acquired when the wheel 11 is at the angle determined in advance. The variation of the pulse count value in the rotation sensor unit corresponding to the wheel 11 where the transmitter 31 that transmitted the transmission signal is arranged thus becomes small compared to when the correction by the correction formula is not carried out. Therefore, the time required to specify on which one of the plurality of wheels 11 each transmitter 31 is arranged is reduced.

The embodiment described above may be modified as below.

In the embodiment described above, the controller 35 causes the transmission signal including the data of the correction angle to be transmitted from the transmitter 31 to the receiver 50, but may calculate the angular difference of the first acquiring angle P5 and the first predetermined angle, and calculate the time difference until the wheel 11 reaches the first predetermined angle from the first acquiring angle P5 from the angular difference. The controller 35 then may cause the transmission signal including the data of the time difference to be transmitted from the transmitter 31. The reception controller 51 acquires the pulse count value at the instant shifted by the time difference from the instant of receiving the transmission signal. Since the past pulse count values are stored in the receiver 50, the receiver 50 can track back from the instant of receiving the transmission signal to acquire the pulse count value. Such pulse count value can be assumed as the pulse count value of when the transmission signal is transmitted at the angle determined in advance. Thus, the position of the wheel 11 where the transmitter 31 is arranged can be specified by using such pulse count value.

Therefore, the time required to specify on which one of the plurality of wheels 11 each transmitter 31 is arranged is reduced.

Figure 9A:
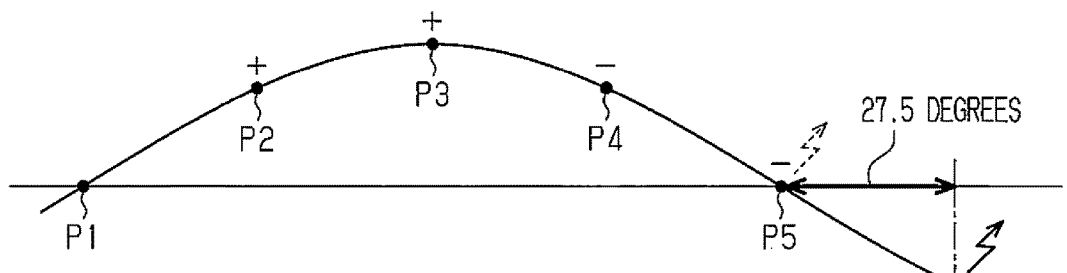
FIGS. 9A to 9C are graphs showing a transmission signal transmitted at a constant angle.
Figure 9B:
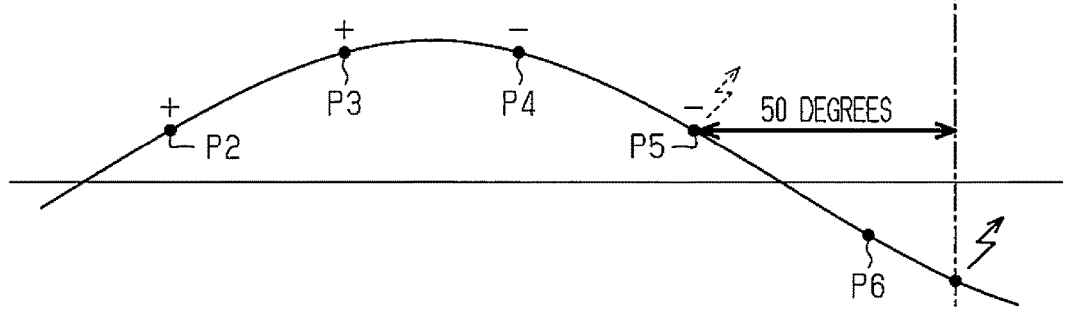
Figure 9C:
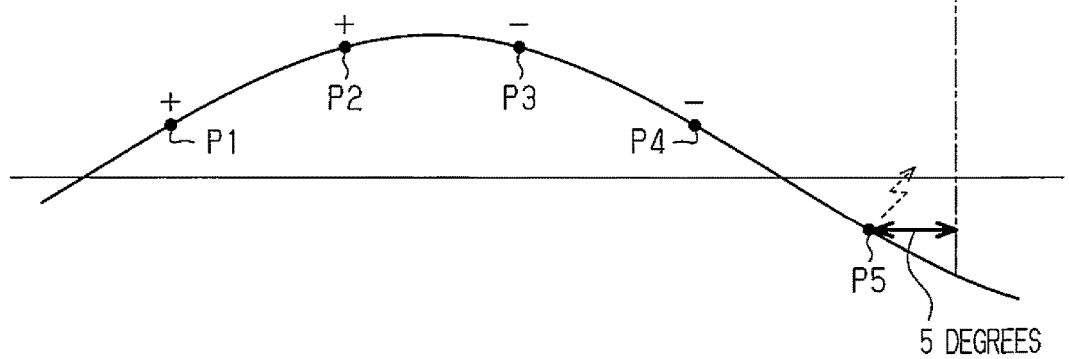

In the embodiment described above, the controller 35 causes the transmission signal including the data of the correction angle to be transmitted from the transmitter 31, but, as shown in FIGS. 9A to 9C, may calculate the angular difference of the first acquiring angle P5 and the first predetermined angle from the acceleration difference and the correction formula, delay the timing to transmit the transmission signal according to the angular difference, and always transmit the transmission signal at a constant angle. For example, if the angular difference of the first acquiring angle P5 and the first predetermined angle is not found, the timing to transmit the transmission signal is delayed by 27.5 degrees. If the angular difference of the first acquiring angle P5 and the first predetermined angle is −22.5 degrees, the timing to transmit the transmission signal is delayed by 50 degrees. If the angular difference of the first acquiring angle P5 and the first predetermined angle is +22.5 degrees, the timing to transmit the transmission signal is delayed by 5 degrees. Thus, the transmission signal is always transmitted at the angle shifted by 27.5 degrees from the first predetermined angle. When transmitting the transmission signal, the angular difference of the first acquiring angle P5 and the first predetermined angle is converted to the time required for the wheel 11 to rotate, and the time to transmit the transmission signal is delayed by such time. The transmission signal is thereby always transmitted at the constant angle (207.5 degrees). The reception controller 51 specifies the position of the wheel 11 where each transmitter 31 is arranged from the variation of the pulse count value of each rotation sensor unit 21 to 24 at the instant of receiving the transmission signal. Although the pulse count value slightly varies due to error, and the like, the pulse count value of the rotation sensor unit corresponding to the wheel 11 where the transmitter 31 that transmitted the transmission signal is arranged is less likely to vary since the transmission signal is always transmitted at a constant angle. Therefore, the time required to specify on which one of the plurality of wheels 11 each transmitter 31 is arranged is reduced. As described above, "the information indicating the angle determined in advance" is not limited to the data included in the transmission signal, and also includes the angle determined by transmitting the transmission signal at a constant angle shifted by a predetermined angle (27.5 degrees) from the angle determined in advance.

In the embodiment described above, the correction formula is stored in the storage unit 35b of the transmitter 31, but may be stored in the reception side storage unit 51b of the receiver 50 that functions as the wheel position specifying position. In this case, the transmitter 31 transmits the transmission signal, which includes the data of the acceleration difference of the acceleration value acquired at the first acquiring angle P5 and the acceleration value acquired at the second acquiring angle P1, at the first acquiring angle P5. The reception controller 51 serving as the reception side acquiring unit acquires the pulse count value of each rotation sensor unit 21 to 24 at the instant of receiving the transmission signal. Furthermore, the reception controller 51 can obtain the acceleration difference of the acceleration value acquired at the first acquiring angle P5 and the acceleration value acquired at the second acquiring angle P1 from the data included in the transmission signal. Thus, the reception controller 51 can calculate the angular difference of the first acquiring angle at which the transmission signal is transmitted and the first predetermined angle from the acceleration difference and the correction formula stored in the reception side storage unit 51b. The reception controller 51 adds (or subtracts) the pulse count value corresponding to the angular difference of the first acquiring angle and the first predetermined angle to (or from) the pulse count value at the instant of receiving the transmission signal. Thus, the pulse count value that can be assumed as the pulse count value of when the angle of the wheel 11 is the first predetermined angle can be obtained. On which wheel 11 each transmitter 31 is arranged thus can be specified by using such pulse count values. Therefore, the time required to specify on which one of the plurality of wheels 11 each transmitter 31 is arranged can be reduced.

When the correction formula is stored in the reception side storage unit 51b, the transmitter 31 may transmit to the receiver 50 the transmission signal including the data of the acceleration value acquired at the first acquiring angle P5 and the data of the acceleration value acquired at the second acquiring angle P1. The reception controller 51 calculates the acceleration difference of the acceleration value of the first acquiring angle P5 and the acceleration value of the second acquiring angle P1 from the data of the acceleration value acquired at the first acquiring angle P5 and the data of the acceleration value acquired at the second acquiring angle P1, and calculates the correction angle from such acceleration difference and the correction formula. The reception controller 51 corrects the pulse count value by the calculated correction angle, and specifies on which wheel 11 each transmitter 31 is arranged by using the corrected pulse count value. Therefore, the "information indicating the acceleration difference" may be the information of the acceleration difference itself, or may be the information used to calculate the acceleration difference in the receiver 50.

In the embodiment described above, the transmission pattern is "+" "+" "−" "−", but may be "+" "−", "−" "−" "+" "+", "−" "+", "+" "+", or "−" "−". That is, an arbitrary transmission pattern can be set from the pattern generated while the wheel 11 makes one rotation. Furthermore, such patterns may be combined.

The correlation between the angular difference of the first acquiring angle P5 and the first predetermined angle and the acceleration difference of the gravitational acceleration value acquired at the first acquiring angle P5 and the gravitational acceleration value acquired at the second acquiring angle P1 exists regardless of the magnitude of the angular difference between the adjacent acquiring angles and the magnitude of the angular difference of the first acquiring angle and the second acquiring angle. Thus, the angular difference between the acquiring angles (i.e., acquiring frequency of the gravitational acceleration value) and the angular difference of the first acquiring angle and the second acquiring angle (i.e., acquiring angle of how many times before the first acquiring angle to set as the second acquiring angle) may be different from the embodiment described above. Furthermore, the second acquiring angle merely needs to be the acquiring angle before the first acquiring angle, and is not limited to the acquiring angle four times before the first acquiring angle. For example, the second acquiring angle may be the acquiring angle three times before the first acquiring angle, or may be the acquiring angle of a period different from the first acquiring angle (period before the first acquiring angle). The correction formula differs by the angular difference between the adjacent acquiring angles, and the angular difference of the first acquiring angle and the second acquiring angle. Thus, the first acquiring angle can be corrected to the first predetermined angle by deriving the correction formula in advance, and storing the correction formula in the storage unit 35*b* or the reception side storage unit 51*b*.

The acceleration sensor 34 may be arranged such that the detection axis 34*a* is directed in the vertical direction when located at the uppermost position of the wheel 11. In this case, the positive and negative of the gravitational acceleration value detected by the acceleration sensor 34 while the wheel 11 makes one rotation are inverted from the embodiment described above.

The acceleration sensor 34 may be configured such that the detection axis is directed in the vertical direction when located at the front most position of the wheel 11 or when located at the rear most position of the wheel 11. In this case, the increase/decrease of the gravitational acceleration value detected by the detection axis is inverted at the front most position of the wheel 11 and the rear most position of the wheel 11. Thus, the transmission signal may be transmitted at the timing the increase/decrease of the gravitational acceleration value is inverted.

The number of pulses generated by the detector 27 each time the wheel 11 makes one rotation may be appropriately changed by changing the number of teeth of the gear 26. Furthermore, the number of pulse counts while the wheel 11 makes one rotation may be changed by counting either the rise or the fall.

The approximate expression is used for the correction formula in the embodiment described above, but a theoretical formula may be used for the correction formula to further enhance the accuracy. Assuming the acceleration difference of the acceleration value acquired at the first acquiring angle P5 and the acceleration value acquired at the second acquiring angle P1 is A, and the angular difference of the first acquiring angle P5 and the first predetermined angle is θ, the acceleration difference A is expressed with the following formula (3).

$$A = (-\sin\theta) - (\sin\theta) = -2\sin\theta \quad (3)$$

According to the formula (3), the following formula (4) is obtained.

$$\sin\theta = -\frac{1}{2}A \quad (4)$$

The formula (4) is stored in the storage unit 35*b* or the reception side storage unit 51*b*. The controller 35 or the reception controller 51 can calculate the correction angle from the formula (4).

DESCRIPTION OF SYMBOLS

10 vehicle
11 wheel
12 vehicle wheel
13 tire
21 to 24 rotation sensor unit
30 tire state monitoring device
31 transmitter
34 acceleration sensor
35 controller
36 transmission circuit
50 receiver
51 reception controller
52 reception circuit

The invention claimed is:

1. A tire state detecting device system, the system comprising:

a first transmitter arranged in an internal space of a first tire attached to a first wheel of a plurality of wheels attached to a plurality of hubs of a vehicle, the first transmitter includes:
a controller including a processor communicatively connected to:
a tire state sensor, operative to sense a gas pressure in the first tire, and output a signal indicative of the sensed gas pressure in the first tire to the controller;
an acceleration sensor operative to rotate integrally with the first wheel and detect an acceleration acting on the acceleration sensor, and output a gravitational acceleration value corresponding to the change in the sensed acceleration value to the controller; and
a transmission circuit operative to transmit data from the controller via a transmission antenna;
wherein the processor of the controller of the first transmitter is operative to use the acceleration value to calculate a time for the first wheel of the vehicle to make a rotation during operation of the vehicle wherein the controller is configured to:
acquire, by the acceleration sensor, the gravitational acceleration value intermittently for every angle defined in advance while the wheel makes one rotation;
assuming an angle of the wheel at which the gravitational acceleration value is acquired is an acquiring angle, calculate an acceleration difference of the gravitational acceleration value acquired at a first acquiring angle and the gravitational acceleration value acquired at a second acquiring angle, the first acquiring angle being an acquiring angle after the timing at which the gravitational acceleration value is inverted from increase to decrease or from decrease to increase, and the second acquiring angle being an angle before the first acquiring angle and before the timing at which the gravitational acceleration value is inverted from increase to decrease or from decrease to increase;
store the following correction formula (1) defined in advance based on an angular difference between the adjacent acquiring angles and an angular difference of the first acquiring angle and the second acquiring angle, and corrects the first acquiring angle to an angle determined in advance from the acceleration difference; and
transmit a transmission signal including information indicating the angle determined in advance in addition to information indicating the state of the tire to the wheel position specifying device;
thereby reducing power consumption of the tire state detecting device and improving the performance of the tire state detection device, $$Y = -\frac{\alpha}{\beta}X \quad (1)$$

Y is a correction angle,
α is a value of one half of the angular difference between the adjacent acquiring angles,
β is an absolute value of a maximum value of the acceleration difference of the gravitational acceleration value acquired at the first acquiring angle and the gravitational acceleration value acquired at the second acquiring angle, and X is the acceleration difference of the gravitational acceleration value acquired at the first acquiring angle and the gravitational acceleration value acquired at the second acquiring angle; and a reception controller including a processor communicatively connected to:
the first transmitter; and
a rotation sensor, the rotation sensor operative to output a pulse count value indicative of a rotational position of the first wheel;
wherein the processor of the reception controller is operative to:
receive a transmission signal from the first transmitter that includes the sensed gas pressure in the first tire and a gravitational acceleration value of the first transmitter;
receive the pulse count value indicative of the rotational position of the first wheel while substantially simultaneously receiving the transmission signal from the first transmitter;
identify which hub of the plurality of hubs of the vehicle the first wheel and the first transmitter arranged in an internal space of a first tire are attached thereto; and
associate the received gas pressure in the first tire with the identified hub of the vehicle the first wheel and the first transmitter arranged in an internal space of a first tire are attached thereto.

2. The tire state detecting device system of claim 1, wherein the tire state sensor further includes a temperature sensor communicatively connected to the controller, the temperature sensor operative to sense a temperature in the first tire and output a signal indicative of the sensed temperature in the first tire to the controller.

3. The tire state detecting device system of claim 1, wherein the acceleration sensor is arranged such that a detection axis is directed downward in a vertical direction when the transmitter is located at a lowermost position of the wheel relative to a driving surface of the vehicle.

4. The tire state detecting device system of claim 1, wherein the acceleration sensor is operative to:
detect a centrifugal acceleration value and detect a gravitational acceleration value; and
add the gravitational acceleration value to obtain the acceleration value.

5. The tire state detecting device system of claim 1, wherein the rotation sensor is communicatively connected to an anti-lock break (ABS) system of the vehicle.

6. The tire state detecting device system of claim 1, wherein the reception controller is communicatively connected to an anti-lock break (ABS) system of the vehicle, and operative to receive a signal from the ABS system indicative of a rotation position of the wheel.

7. The tire state detecting device system of claim 1, further comprising a display operative to receive and display to a user the associated the received gas pressure in the first tire with the identified hub of the vehicle the first wheel and the first transmitter arranged in an internal space of a first tire are attached thereto.

8. The tire state detecting device system of claim 1, wherein the first transmitter further includes a battery.

9. A tire state detecting device arranged in each of a plurality of wheels of a vehicle, the vehicle including:
a rotation position detecting unit that detects a rotation position of each of the plurality of wheels, and
a wheel position specifying device that specifies on which one of the plurality of wheels the tire state detecting device is arranged by acquiring a rotation position of the wheel detected by the rotation position detecting unit with reception of the transmission signal transmitted from the transmission unit as a trigger,
the tire state detecting device comprising:
a state detecting unit that detects a state of a tire;
an acceleration sensor that rotates integrally with the wheel and detects a gravitational acceleration value; and
a controller, wherein the controller is configured to:
acquire, by an acceleration sensor, the gravitational acceleration value intermittently for every angle defined in advance while the wheel makes one rotation;
assuming an angle of the wheel at which the gravitational acceleration value is acquired is an acquiring angle, calculate an acceleration difference of the gravitational acceleration value acquired at a first acquiring angle and the gravitational acceleration value acquired at a second acquiring angle, the first acquiring angle being an acquiring angle after the timing at which the gravitational acceleration value is inverted from increase to decrease or from decrease to increase, and the second acquiring angle being an angle before the first acquiring angle and before the timing at which the gravitational acceleration value is inverted from increase to decrease or from decrease to increase;
store the following correction formula (1) defined in advance based on an angular difference between the adjacent acquiring angles and an angular difference of the first acquiring angle and the second acquiring angle, and corrects the first acquiring angle to an angle determined in advance from the acceleration difference; and
transmit a transmission signal including information indicating the angle determined in advance in addition to information indicating the state of the tire to the wheel position specifying device;
thereby reducing power consumption of the tire state detecting device and improving the performance of the tire state detection device, $$Y = -\frac{\alpha}{\beta}X \qquad (1)$$

Y is a correction angle,
α is a value of one half of the angular difference between the adjacent acquiring angles,
β is an absolute value of a maximum value of the acceleration difference of the gravitational acceleration value acquired at the first acquiring angle and the gravitational acceleration value acquired at the second acquiring angle, and
X is the acceleration difference of the gravitational acceleration value acquired at the first acquiring angle and the gravitational acceleration value acquired at the second acquiring angle.

* * * * *